Patented July 14, 1953

2,645,562

UNITED STATES PATENT OFFICE 2,645,562

PRODUCTION OF A GASEOUS PETROLEUM
FRACTION RICH IN HYDROGEN

John Norman Haresnape and Stephen Hesling, Sunbury-on-Thames, England, assignors to Anglo-Iranian Oil Company Limited, London, England, a British joint-stock corporation No Drawing. Application January 21, 1948, Serial No. 3,563. In Great Britain January 10, 1947

Section 1, Public Law 690, August 8, 1946
Patent expires January 10, 1967

5 Claims. (Cl. 23—212)

This invention relates to a process for the production of hydrogen by the catalytic cracking of petroleum fractions.

The catalytic cracking of higher boiling petroleum fractions for the production of gasoline and gas-oil is well-known, and catalysts commonly employed for such cracking operations include artificially prepared mixed silica-alumina gel, either in the form of granules or pellets, or, as in the fluid catalytic cracking process, in the form of a fine powder, and the so-called "natural" catalyst, being usually a montmorillonite clay of fairly high purity which has been leached with mineral acid to enhance its catalytic activity. Such catalysts yield a gaseous product which contains only a small percentage of hydrogen and therefore the catalytic cracking process has not hitherto been regarded as a potential source of hydrogen.

It has now been found that if the catalytic cracking process is carried out with a catalyst as hereinafter defined, a gaseous product is obtained having a greatly increased hydrogen content. Furthermore, the production of such a hydrogen-rich gaseous fraction may be accomplished without any substantial reduction in the amount of the desirable lower boiling hydrocarbons, such as gasoline and gas oil, produced.

According to the invention, a process for the production of hydrogen comprises cracking a petroleum fraction boiling in the gas oil range or higher in the presence of a catalyst consisting essentially of a montmorillonite clay from which some or all of the combined hydroxyl groups have been removed by heating the clay to a temperature sufficient to effect such removal without causing any physical disruption of the clay, and separating a gaseous fraction rich in hydrogen from the products of the cracking operation. The montmorillonite clay may be used raw or may be leached with acid to enhance its catalytic activity either before or after dehydration.

Montmorillonite may be represented by the approximate formula $$Al_2O_3.H_2O.4SiO_2.xH_2O$$

with the $Al_2O_3$ partially replaced by iron oxide, magnesium oxide, sodium oxide and the like, and the effect of heating is first to eliminate the $x$ molecules of water at a temperature of 100–200° C., and thereafter the combined hydroxyl groups at a much higher temperature. We have found that the temperature with which it is necessary to heat the clay to initiate the loss of the combined hydroxyl groups lies within the range 500–700° C. depending upon the content of certain impurities, notably iron and sodium. For example, montmorillonites having a high content of iron and/or sodium dehydrate near the lower limit of this range, while those having a low content of iron and/or sodium dehydrate near the upper limit of the range. As a general rule, those montmorillonites having more than 7% iron oxide will be substantially completely dehydrated at temperatures around 500° C., while those with less than 1.5% iron oxide, only at temperatures approaching 700° C.

The combined hydroxyl groups may be removed from a part or all of the catalyst, since the dehydrogenation type of activity begins to appear as soon as the loss of the combined hydroxyl groups commences. In practice, it is improbable that the mineral is completely dehydrated in heating to the determined temperature.

The activity of the catalysts used according to the present invention as dehydrogenation catalysts tends to decline if they become rehydrated either prior to use as a catalyst, or at some stage in the catalytic cracking process, as for instance by exposure to steam at high temperature. According to a further feature of the invention, such decline may be prevented or reduced by use of the catalyst, which has been treated, while in the dehydrated state, with hydrogen sulphide at a temperature of about 850° F. It is possible that the hydrogen sulphide molecules enter into the structure of the montmorillonite in substitution for the water removed on dehydration. The necessary treatment with hydrogen sulphide may be effected by using the dehydrated catalyst, before it has had an opportunity of becoming rehydrated, to crack a feedstock containing sulphur whereby hydrogen sulphide is liberated as the cracking reaction proceeds. On the other hand, the dehydrated catalyst may be treated with hydrogen sulphide in a separate operation prior to being used as a cracking catalyst.

We have also found that an acid treated montmorillonite catalyst of low iron content, which has lost a large part of its activity for catalytic cracking, may be converted into a stable catalyst for use according to the present invention simply by heating to a temperature sufficient to dehydrate the catalyst completely. Such application of the invention is of particular advantage inasmuch as spent montmorillonite cracking catalysts, which would normally be discarded, may be converted into valuable catalysts according to the present invention.

Thus, one example of a catalyst for use according to the invention is a fuller's earth, having the analysis (a) in Table 1 below, which, after acid treatment had the analysis (b) as set out in Table 1. This material requires heating to 500° C. only, for dehydration to take place and the desired type of activity to be developed. Another example is a bentonite (consisting essentially of montmorillonite) having the analysis (c) as set out in Table 1 which after acid treatment had the analysis (d) as set out in Table 1. This material requires heating to a temperature of 650°–700° C. before developing the desired type of activity:

TABLE 1

| Constituent | a | b | c | d |
|---|---|---|---|---|
| $SiO_2$ ---percent wt-- | 61.0 | 64.7 | 50.5 | 50.2 |
| $Al_2O_3$ ---percent wt-- | 14.9 | 11.7 | 17.0 | 8.2 |
| $Fe_2O_3 + FeO$ ---percent wt-- | 8.2 | 5.6 | 1.1 | 0.4 |
| $CaO$ ---percent wt-- | 2.4 | 4.1 | 4.2 | 1.9 |
| $MgO$ ---percent wt-- | 3.8 | 3.9 | 5.4 | 0.9 |
| $H_2O$ ---percent wt-- | 5.9 | 5.3 | 23.8 | 35.5 |

Using a catalyst as hereinbefore defined and with equal conversion of the feedstock to lower boiling products, the make of gas may be more than doubled in volume, the whole of the increase being represented by an increase in the amount of hydrogen produced. Thus, by cracking a wax distillate, boiling in the range 650°–900° F., and representing the portion obtained between 68.6 and 79.0% weight in the fractional distillation of Iranian crude oil, on a synthetic silica-alumina catalyst or on a natural catalyst which is not dehydrated, the product which is gaseous at −40° C. contains less than 25% hydrogen, whereas by cracking the same wax distillate on the dehydrated catalyst according to the invention, the gaseous product contains more than 40% hydrogen under a wide variety of conditions and may contain as much as 80% hydrogen; and whereas on the former catalysts, the hydrogen produced does not exceed 150 cu. ft./bbl. of feedstock processed, on the dehydrated catalyst according to the invention it may be as high as 680 cu. ft./bbl. In a similar conversion of feedstock to lower boiling products, the conversion to gasoline is rather lower, and that to gas-oil rather higher, when using the dehydrated catalyst according to the invention.

In the process of the invention the gasoline contains a larger proportion of the less volatile components and the decrease is almost entirely confined to the fractions boiling below 100° C. This may be an advantage in any refinery where the more volatile hydrocarbons are in excess of requirements for balanced production. The octane number of the gasoline and the quality of the gas-oil are similar to those of the products obtained on undehydrated natural catalysts. Under comparable conditions of temperature, contact time and the like, the conversion of feedstock to lower boiling hydrocarbons is rather less than on a synthetic silica-alumina catalyst or on a undehydrated natural clay catalyst, but this can be compensated for in a continuous unit by operating both the reaction and regeneration steps at a higher temperature, since with the type of catalyst used according to the invention it is not necessary to limit so severely the maximum temperature to which it is subjected, in order to prevent decrease in the activity of the catalyst.

The analysis of three typical gas mixtures (a), (b) and (c) obtained by the cracking of the above defined wax distillate in accordance with the process of the invention are given in Table 2 below.

TABLE 2

| Constituent | a | b | c |
|---|---|---|---|
| $H_2$ | 63.0 | 70.0 | 77.1 |
| $CH_4$ | 13.0 | 9.3 | 7.2 |
| $C_2H_4$ | 4.3 | 3.6 | 1.9 |
| $C_2H_6$ | 7.1 | 5.3 | 3.7 |
| $C_3H_6$ | 3.9 | 2.9 | 2.4 |
| $C_3H_8$ | 3.2 | 2.9 | 2.2 |
| $C_4H_8$ | 2.1 | 3.9 | 3.1 |
| $C_4H_{10}$ | 1.2 | | |
| $C_5+$ | 1.8 | 1.5 | 1.8 |
| $H_2S$ | 0.4 | 0.6 | 0.6 |

For many purposes these gases are sufficiently rich in hydrogen for use as produced, but may be further purified by any known method.

The following examples show how hydrogen of 95% purity may be produced by the process according to the invention.

*Example 1*

A waxy distillate feedstock boiling in the range 650–900° F. and representing the portion obtained between 68.6 and 79.0% weight in a fractional distillation of an Iranian crude oil, and containing 1.5% by weight of combined sulphur, was cracked over a catalyst having, before heating, the analysis (b) in Table 1. The catalyst was in the form of pellets, the temperature 950° F., throughput 0.9 v./v./hr. and pressure atmospheric. Operation was in 3-hour cycles, the catalyst being used for 2 hours for cracking and then regenerated by passing air over the catalyst for 1 hour. The product consisted of 19.5% gasoline distilling below 430° F., 28.5% gas-oil, distilling between 430° and 740° F., 35.8% residue distilling above 740° F., 7.8% carbon deposited on to the catalyst and 8.4% gas. The gas amounted in volume to 840 cu. ft. (measured at 60° F., and atmospheric pressure) per barrel of feedstock processed and had the analysis (b) of Table 2. It was compressed to 160 lb. per sq. inch gauge and passed at 75° F. through an absorption tower of six theoretical plates, countercurrent to a naphtha fraction (mean molecular weight 110) from Iranian crude oil, in a ratio of 250 lb. of naphtha to each 1000 cu. ft. (measured at 60° F. and atmospheric pressure) of gas. The naphtha leaving the absorption tower was rendered substantially free from dissolved gases by heating, and was then recycled. The gas leaving the absorption tower contained 95.6 mol. per cent hydrogen, 4.2% methane and 0.2% other constituents, mainly ethane.

*Example 2*

A waxy distillate feedstock boiling in the range 650–900° F. and representing the portion obtained between 68.6 and 79.0% weight in a fractional distillation of an Iranian crude oil, and containing 1.5% by weight of combined sulphur, was cracked over a catalyst which had previously been heated to a temperature of 1250° F. and which had before heating the analysis (d) of Table 1. The catalyst was in the form of pellets, the temperature 850° F., throughput 0.6 v./v./hr. and pressure atmospheric. Operation was in 3-hour cycles, the catalyst being used for 2 hours for cracking and then regenerated by passing air over the catalyst. The product consisted of 20.3% gasoline distilling below 430° F., 25.2% gas-oil, distilling between 430 and 740° F., 42.4% residue distilling above 740° F., 5.0% carbon deposited on the catalyst and 7.1% gas. The gas amounted in volume to 580 cu. ft. (measured at 60° F., and atmospheric pressure) per barrel of feedstock processed and had the following analysis:

| | |
|---|---|
| $H_2$ | 68.6 |
| $CH_4$ | 8.4 |
| $C_2H_4$ | 1.4 |
| $C_2H_6$ | 6.1 |
| $C_3H_6$ | 4.4 |
| $C_3H_8$ | 3.0 |
| $C_4H_8$ | 2.8 |
| $C_4H_{10}$ | 3.9 |
| $C_5+$ | 0.8 |
| $H_2S$ | 0.5 |

It was compressed to 160 lb. per sq. inch gauge and passed at 75° F. through an absorption tower of six theoretical plates, counter-current to a naphtha fraction (mean molecular weight 110) from Iranian crude oil, in a ratio of 250 lb. of naphtha to each 1000 cu. ft. (measured at 60° F. and atmospheric pressure) of gas. The naphtha leaving the absorption tower was rendered substantially free from dissolved gases by heating, and was then recycled. The gas leaving the absorption tower contained 95.6 mol. per cent hydrogen, 4.2% methane and 0.2% other constituents, mainly ethane.

The following example shows the substantial difference in the hydrogen content of the product gases from two runs which are identical in every respect except that in one case the clay has been pre-treated with $H_2S$ gas.

*Example 3*

200 ml. of pellets of an activated montmorillonite clay having an iron oxide of 3.3% weight were heated for 5 hours at 1050° F. (566° C.) in an electric muffle furnace, cooled in a desiccator and packed into a reactor. The temperature of the reactor was raised to 1050° F. and a slow stream of dry nitrogen passed through while the temperature was lowered to 900° F. (This was done to prevent rehydration.) The catalyst was then treated with hydrogen sulphide for one hour at atmospheric pressure and 900° F. by passing the gas at 6 gaseous volumes per volume of catalyst space per hour. The reactor was then cooled to 850° F. in a stream of dry nitrogen and the catalyst then used to crack an East Texas Gas Oil feedstock (A. P. I. gravity 34, I. B. P. 244° C., F. B. P. 365.5° C., aniline point 77.8° C., sulphur content 0.258% weight) at 850° F. and atmospheric pressure with a throughput of 0.6 volume of oil per volume of catalyst space per hour and a process period of two hours. The gas make in the 2 hours was 32.4 litres having a density of 0.334 gm./litre and containing 77.5 mol. per cent hydrogen. On regeneration by passing air and re-use for cracking under the same conditions the gas make and the hydrogen content fell slightly but after six cycles of reaction and regeneration were 25.5 litres per 2 hours and 74.2% hydrogen respectively.

An identical sample of catalyst pellets pretreated in the same way at 1050° F. in the electric muffle furnace but not then kept out of contact with moist air was packed into a similar reactor, the temperature raised to 850° F. and without any pretreatment with $H_2S$ the cracking of the same East Texas Gas Oil as before was carried out under similar conditions. The gas make was 12.4 litres in the two hour period, the gas had a density of 1.062 gm./litre and contained 28.4 mol. per cent hydrogen. On regeneration by passing air and re-use for cracking the products were essentially the same.

We claim:

1. A process for the production of a gaseous petroleum fraction rich in hydrogen which comprises cracking a petroleum fraction containing substantially no material boiling below the gas oil range in the presence of a catalyst consisting essentially of a montmorillonite clay which has been heated to a temperature between about 500° C. and 700° C. to remove substantially completely the combined hydroxyl groups without causing any physical disruption of the clay and from which clay, as it is employed in the cracking step, the combined hydroxyl groups are substantially completely absent, said temperature being in inverse relationship to the iron oxide content present in said montmorillonite clay such that when the iron oxide content is less than 1.5%, the temperature will be about 700° C., and when the iron oxide content is more than 7%, the temperature will be about 500° C.; and, separating a gaseous petroleum fraction rich in hydrogen from the products of the cracking operation.

2. A process according to claim 1, in which said clay has an iron oxide content of more than 7% by weight and is heated to a temperature of about 500° C.

3. A process according to claim 1, in which said clay has an iron oxide content of less than 1.5% by weight and is heated to a temperature of about 700° C.

4. A process in accordance with claim 1 wherein the heated clay is treated with hydrogen sulfide to stabilize it against rehydration.

5. A process in accordance with claim 1 wherein the petroleum fraction is a sulfur-containing petroleum feedstock.

JOHN NORMAN HARESNAPE.
STEPHEN HESLING.

References Cited in the file of this patent

UNITED STATES PATENTS

| Number | Name | Date |
|---|---|---|
| 1,221,698 | Day | Apr. 3, 1917 |
| 2,078,945 | Houdry | May 4, 1937 |
| 2,129,693 | Houdry | Sept. 13, 1938 |
| 2,148,129 | Morrell et al. | Feb. 21, 1939 |
| 2,222,400 | Butz | Nov. 19, 1940 |
| 2,227,672 | Pier et al. | Jan. 7, 1941 |
| 2,248,357 | Kanhofer | July 8, 1941 |
| 2,249,584 | Thomas | July 15, 1941 |
| 2,264,427 | Asbury | Dec. 2, 1941 |
| 2,268,094 | Russell | Dec. 30, 1941 |
| 2,305,220 | Legg | Dec. 15, 1942 |
| 2,326,706 | Thomas et al. | Aug. 10, 1943 |
| 2,339,248 | Danforth | Jan. 18, 1944 |
| 2,371,079 | Thomas et al. | Mar. 6, 1945 |
| 2,371,890 | Herold et al. | Mar. 20, 1945 |
| 2,432,822 | Secor | Dec. 16, 1947 |
| 2,464,127 | Gary | Mar. 8, 1949 |
| 2,466,050 | Shabecker et al. | Apr. 5, 1949 |
| 2,495,751 | Mills et al. | Jan. 31, 1950 |

OTHER REFERENCES

Ser. No. 330,613, Woog (A. P. C.), published May 18, 1943.

A. N. Sachanen: "Conversion of Petroleum," 1940 ed., pp. 369–372, Reinhold Publishing Corp., N. Y.

A. N. Sachanen: "The Chemical Constituents of Petroleum," 1945 ed., pp. 364–367, Reinhold Publishing Corp., N. Y.